(12) United States Patent
Yokozawa et al.

(10) Patent No.: US 12,115,702 B2
(45) Date of Patent: Oct. 15, 2024

(54) APPARATUS AND METHOD FOR MANUFACTURING REACTOR

(71) Applicant: TOYOTA JIDOSHA KABUSHIKI KAISHA, Toyota (JP)

(72) Inventors: Ryo Yokozawa, Nisshin (JP); Mitsuyasu Higano, Toyota (JP); Shun Kishimoto, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 50 days.

(21) Appl. No.: 18/047,353

(22) Filed: Oct. 18, 2022

(65) Prior Publication Data
US 2023/0158715 A1    May 25, 2023

(30) Foreign Application Priority Data
Nov. 22, 2021 (JP) ................. 2021-189289

(51) Int. Cl.
  *B29C 33/30* (2006.01)
  *B29C 33/38* (2006.01)
(52) U.S. Cl.
  CPC ........ *B29C 33/304* (2013.01); *B29C 33/3807* (2013.01)
(58) Field of Classification Search
  CPC .................................................. B29C 33/304
  See application file for complete search history.

(56) References Cited

U.S. PATENT DOCUMENTS

| | | | |
|---|---|---|---|
| 2009/0115106 A1* | 5/2009 | Itabashi | B29C 33/123 264/328.16 |
| 2014/0094640 A1 | 4/2014 | Gall et al. | |
| 2018/0075964 A1* | 3/2018 | Suzuki | H01F 27/263 |
| 2019/0131052 A1* | 5/2019 | Kusawake | H01F 27/022 |
| 2021/0020351 A1* | 1/2021 | Takeuchi | H01F 41/0246 |

FOREIGN PATENT DOCUMENTS

| | | | | |
|---|---|---|---|---|
| JP | H 02-127418 U | 10/1990 | | |
| JP | H 09-007857 A | 1/1997 | | |
| JP | 2003-173917 A | 6/2003 | | |
| JP | 2011011426 A * | 1/2011 | | H01L 21/52 |
| JP | 2013-149841 A | 8/2013 | | |
| JP | 2014229837 A * | 12/2014 | | |
| JP | 2017-130470 A | 7/2017 | | |
| JP | 2018099795 A * | 6/2018 | | |

* cited by examiner

*Primary Examiner* — Alison L Hindenlang
*Assistant Examiner* — Virak Nguon
(74) *Attorney, Agent, or Firm* — Oblon, McClelland, Maier & Neustadt, L.L.P.

(57) ABSTRACT

An apparatus and a method for manufacturing a reactor capable of both absorbing a dimensional variation of a core and preventing deformation due to a resin pressure during molding are provided. An apparatus for manufacturing a reactor is provided with a core. The apparatus includes a mold including a cavity for housing the core. The mold includes a plurality of pins protruding into the cavity. When the core is disposed in the cavity, at least one of the plurality of pins is not fixed, and each of the pins functions as a positioning pin. When a molded article is molded, the pin is fixed, and each pin functions as a core support pin for supporting the core against a resin pressure during molding.

6 Claims, 16 Drawing Sheets

APPARATUS AND METHOD FOR MANUFACTURING REACTOR

CROSS REFERENCE TO RELATED APPLICATIONS

This application is based upon and claims the benefit of priority from Japanese patent application No. 2021-189289, filed on Nov. 22, 2021, the disclosure of which is incorporated herein in its entirety by reference.

BACKGROUND

The present disclosure relates to an apparatus and a method for manufacturing a reactor.

Japanese Unexamined Patent Application Publication No. 2013-149841 discloses a method for manufacturing a reactor including a primary molding step and a secondary molding step. According to the technique described in Japanese Unexamined Patent Application Publication No. 2013-149841, a common mold can be used for both primary and secondary molding.

SUMMARY

A plurality of positioning pins for positioning a core are arranged in a mold included in an apparatus for manufacturing a reactor. If the positioning pin cannot withstand a resin pressure during molding, there is a problem that the core is cracked by the resin pressure during molding. On the other hand, when a high pressure is applied to the positioning pins so as to withstand the resin pressure, there is a problem that the core is cracked during positioning due to a dimensional variation of the core.

The present disclosure has been made in order to solve such a problem, and an object of the present disclosure is to provide an apparatus and a method for manufacturing a reactor capable of both absorbing a dimensional variation of a core and preventing deformation due to a resin pressure during molding.

In an example aspect of the present disclosure, an apparatus for manufacturing a reactor provided with a core includes:
 a mold including a cavity for housing the core, wherein
 the mold includes a plurality of pins protruding into the cavity,
 when the core is disposed in the cavity, at least one of the plurality of pins is not fixed, and each of the pins functions as a positioning pin, and
 when a molded article is molded, the at least one pin is fixed, and each pin functions as a core support pin for supporting the core against a resin pressure during molding.

In another example aspect of the present disclosure, a method for manufacturing a reactor provided with a core includes:
 disposing the core in a mold including a cavity for housing the core; and
 molding a molded article by using the mold, wherein
 the mold includes a plurality of pins protruding into the cavity,
 in the disposing of the core, at least one of the plurality of pins is not fixed, and each of the pins functions as a positioning pin, and
 in the molding of the molded article, the at least one pin is fixed, and each pin functions as a core support pin for supporting the core against a resin pressure during molding.

According to the present disclosure, it is possible to provide an apparatus and a method for manufacturing a reactor capable of both absorbing a dimensional variation of a core and preventing deformation due to a resin pressure during molding.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Study Leading to Embodiments

Figure 1:
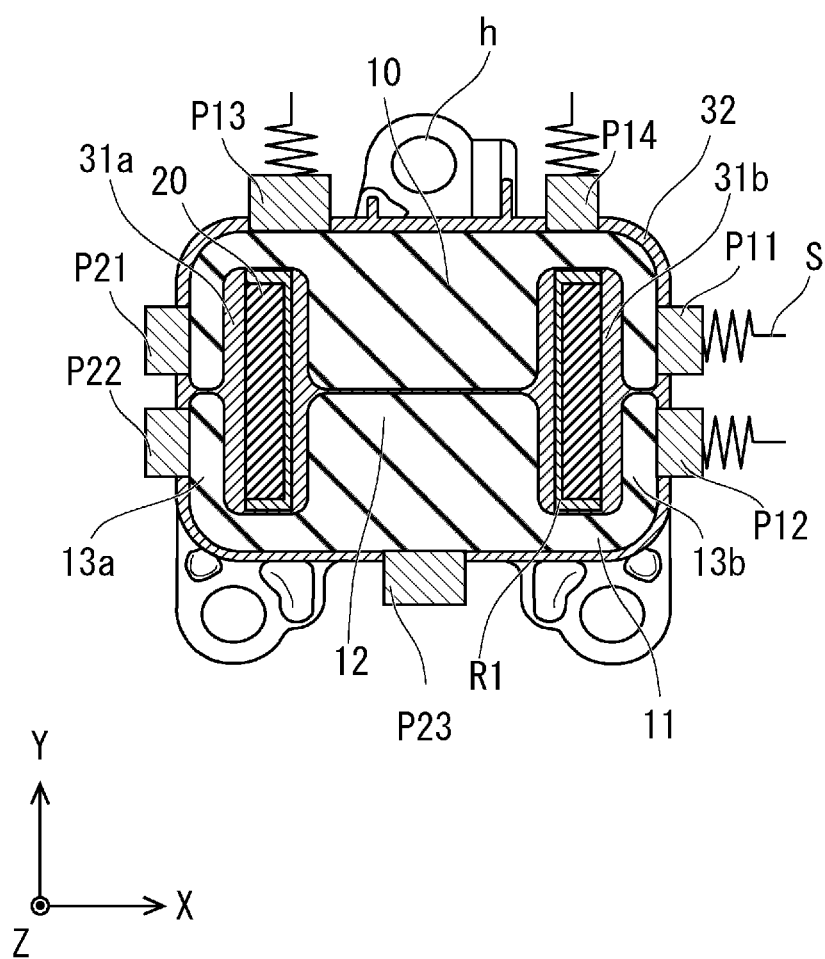
FIG. 1 is a schematic top view showing an overview of a mold of a manufacturing apparatus according to related art.

First, the contents of the study conducted by the inventor of the present application will be described. FIG. 1 is a schematic top view showing an overview of a mold 200 of a related manufacturing apparatus. The related manufacturing apparatus is an apparatus for manufacturing a reactor provided with a core 10. A resin is injected around the core 10 inserted into the mold 200 and a coil mold 20 molded with a resin, and insert molding is performed. A reference sign R1 indicates the resin included in the coil mold 20. A hole h is an insertion hole for a bolt or the like, and is formed of a resin. A resin flow path during molding includes inner flow paths 31a and 31b flowing inside the core 10 and outer flow paths 32 flowing outside the core 10. FIG. 1 shows an internal state of the mold 200 during insert molding.

FIG. 1 shows a three-dimensional orthogonal coordinate system of XYZ for clarity of explanation. Note that a Z direction is a vertical direction. Therefore, the Z direction is a height direction. The resin is injected, for example, in a negative direction of a Z-axis.

The mold 200 includes a cavity for housing the core 10. For example, a pair of E-shaped cores 10 are inserted into the cavity. The core 10 includes a base core 11, a middle leg core 12, and outer leg cores 13a and 13b. Hereinafter, when the outer leg cores 13a and 13b are not distinguished from each other, they may be referred to simply as the outer leg cores 13. The middle leg core 12 and the outer leg core 13 project from the base core 11 in the same direction. A width of each of the outer leg cores 13 (e.g., a length thereof along the X-axis direction) is shorter than the width of the middle leg core 12. In FIG. 1, an X-axis direction indicates a direction in which the base core 11 is extended, and a Y-axis direction indicates a direction in which the middle leg core 12 and the outer leg core 13 are extended.

The mold 200 includes pins P11, P12, P13, P14, P21, P22, and P23 protruding into the cavity. The pins P21 and P22 are in contact with an end face of the core 10 on the negative direction side of the X-axis, and the pins P11 and P12 are in contact with an end face of the core 10 on the positive direction side of the X-axis. The pin P23 is in contact with an end face of the core 10 on the negative direction side of the Y-axis, and the pins P13 and P14 are in contact with an end face of the core 10 on the positive direction side of the Y-axis. Since the resin is not injected into the parts of the core where the pins P11, P12, P13, P14, P21, P22, and P23 are in contact with the core 10 during molding, windows corresponding to the pins P11, P12, P13, P14, P21, P22, and P23 are formed in a molded article.

The pins P11 to P14 are connected to the mold 200 with springs S interposed therebetween and are not fixed. The pins P21 to P23 are fixed to the mold 200. The springs S may be metal springs such as coil springs or leaf springs, fluid springs such as air springs, or springs made of an elastic material such as rubber or resin. Hereinafter, when the pins P11 to P14 are not distinguished from each other, they may be referred to simply as pins P1. Similarly, when the pins P21 to P23 are not distinguished from each other, they may be simply referred to as pins P2. The positions of the pins P2 are held constant, and the positions of the pins P1 may be displaced according to a pressure received from the core 10. When the pins P1 and P2 are not distinguished from each other, they may be simply referred to as pins P.

Note that at least one of the pins P in contact with the end face of the core 10 on the positive direction side of the X-axis and the pins P in contact with the end face of the core 10 on the negative direction side of the X-axis may be connected to the springs S, respectively. Similarly, at least one of the pins P in contact with the end face of the core 10 on the positive direction side of the Y-axis and the pins P in contact with the end face of the core 10 on the negative direction side of the Y-axis may be connected to the springs S, respectively.

The pins P11 and P12 are displaced in the positive direction of the X-axis according to the length of the core 10 in the X-direction. The pins P13 and P14 are displaced in the positive direction of the Y-axis according to the length of the core 10 in the Y-axis direction. Thus, the pins P11, P12, P13, P14, P21, P22, and P23 can position the core 10 while absorbing the dimensional variation of the core 10. The outer leg core 13b of the core 10 is pressurized in the negative direction of the X-axis by the displacement of the pins P11 and P12.

As described above, the resin flow paths during molding include the inner flow paths 31a and 31b passing through the inside of the core 10 and the outer flow path 32 passing through the outside of the core 10. The inner flow path 31a passes around the coil mold 20. When the resin is injected into the inner flow path 31b preferentially over the outer flow path 32, the outer leg core 13b is pressurized in the positive direction of the X-axis by the resin of the inner flow path 31b. In order to prevent the deformation of the outer leg core 13 from the outside, the resin may be preferentially injected into the inner flow paths 31. Normally, since the pressure applied by the pins P11 and P12 is smaller than the resin pressure, the deformation of the outer leg core 13b from the outside cannot be prevented, resulting in a problem that the core 10 is cracked.

Therefore, in order to prevent the core 10 from being cracked during molding, the outer leg core 13b needs to be strongly pressurized in the negative direction of the X-axis, for example, by increasing a spring coefficient of the springs S. However, if the pins P11 and P12 are configured to pressurize the outer leg core 13b strongly, the core 10 may be cracked when the core 10 is positioned. The inventor of the present application arrived at the present disclosure according to the embodiments based on the above study.

First Embodiment

Hereinafter, the present disclosure will be described through embodiments of the disclosure, but the disclosure according to the claims is not limited to the following embodiments. Further, not all of the configurations described in the embodiments are essential as means for solving the problem.

Figure 2:
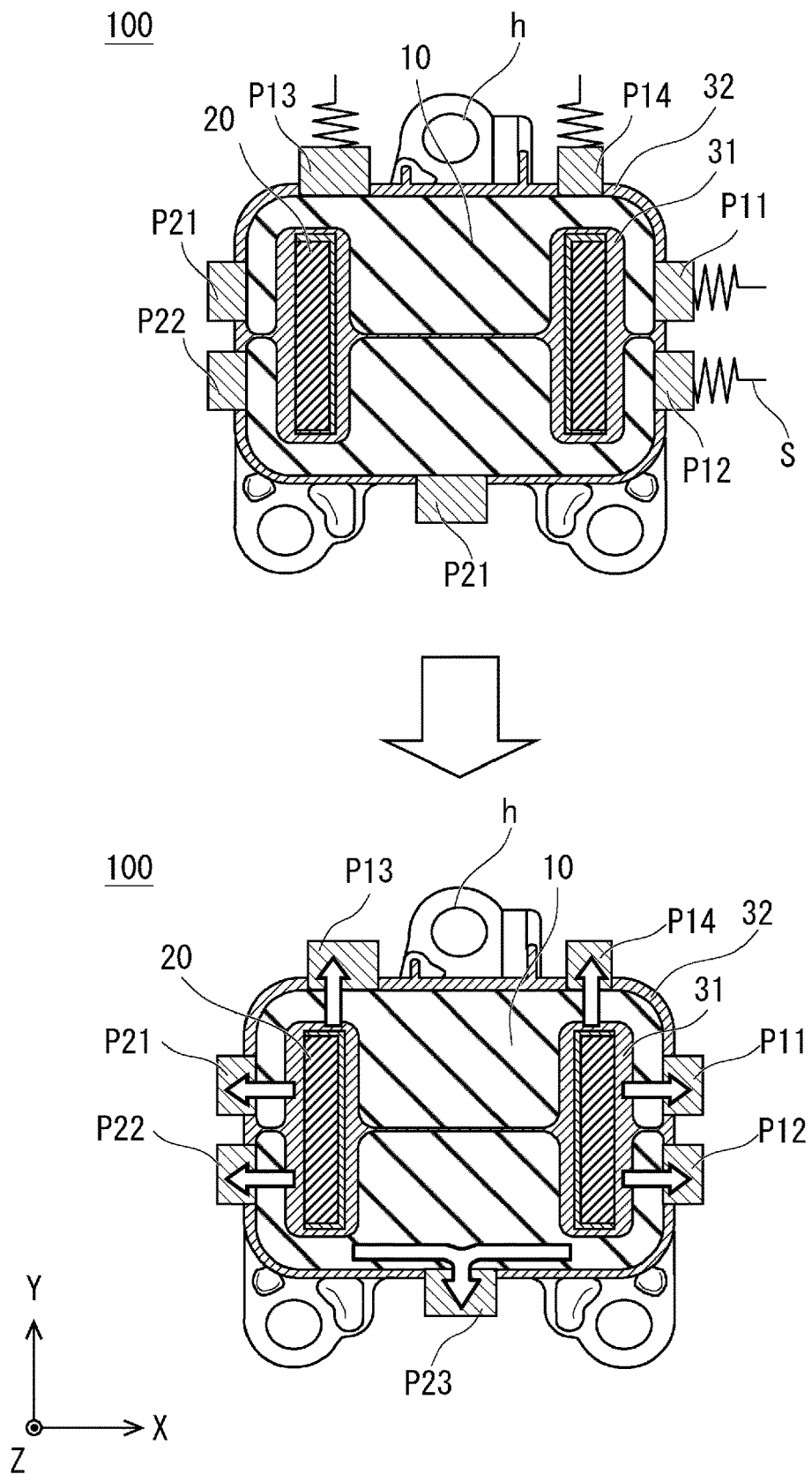
FIG. 2 is a schematic top view showing an overview of a mold of a manufacturing apparatus according to a first embodiment.

A manufacturing apparatus according to a first embodiment will be described below with reference to the drawings. FIG. 2 is a schematic top view showing an overview of a mold 100 of the manufacturing apparatus according to the first embodiment. In the following description, differences of the mold 100 of the manufacturing apparatus according to the first embodiment from the mold 200 of the related manufacturing apparatus will be mainly described.

The upper drawing of FIG. 2 shows a state of the mold 100 when the core 10 is disposed, and the lower drawing of FIG. 2 shows the state of the mold 100 when a molded article is molded. A downward arrow between the upper and lower drawings indicate that the state of the mold 100 is changed. In the upper drawing of FIG. 2, the pins P1 are connected to the springs S, respectively. However, in the lower drawing of FIG. 2, the pins P1 are not connected to the springs S, respectively. Note that as described above, the pins P1 indicate pins P11 to P14. The upper drawing of FIG. 2 shows that the pins P1 are not fixed when the core 10 is disposed, and the pins P1 are displaced by the pressure received from the core. When the core 10 is disposed in the cavity, each pin P functions as a positioning pin.

The lower drawing of FIG. 2 shows that the pins P1 are fixed to the mold 100 during molding. The pins P11 to P14 and P21 to P23 can prevent the core 10 from being deformed by the applied pressure indicated by the arrows. Note that the downward arrow indicates that the resin pressure is received from both of the two inner flow paths 31. When a molded article is molded, each pin P functions as a core support pin for supporting the core 10 against the resin pressure during molding.

The state in which the pins P1 are not fixed and the state in which the pins P1 are fixed are switched according to whether the mold 100 is opened or closed. Since the core 10 is disposed with the mold 100 open, the pins P1 are not fixed in the upper drawing of FIG. 2. Since the mold 100 is closed during molding, the pins P1 are fixed in the lower drawing of FIG. 2. The specific configuration of the mold 100 will be described later.

Figure 3:
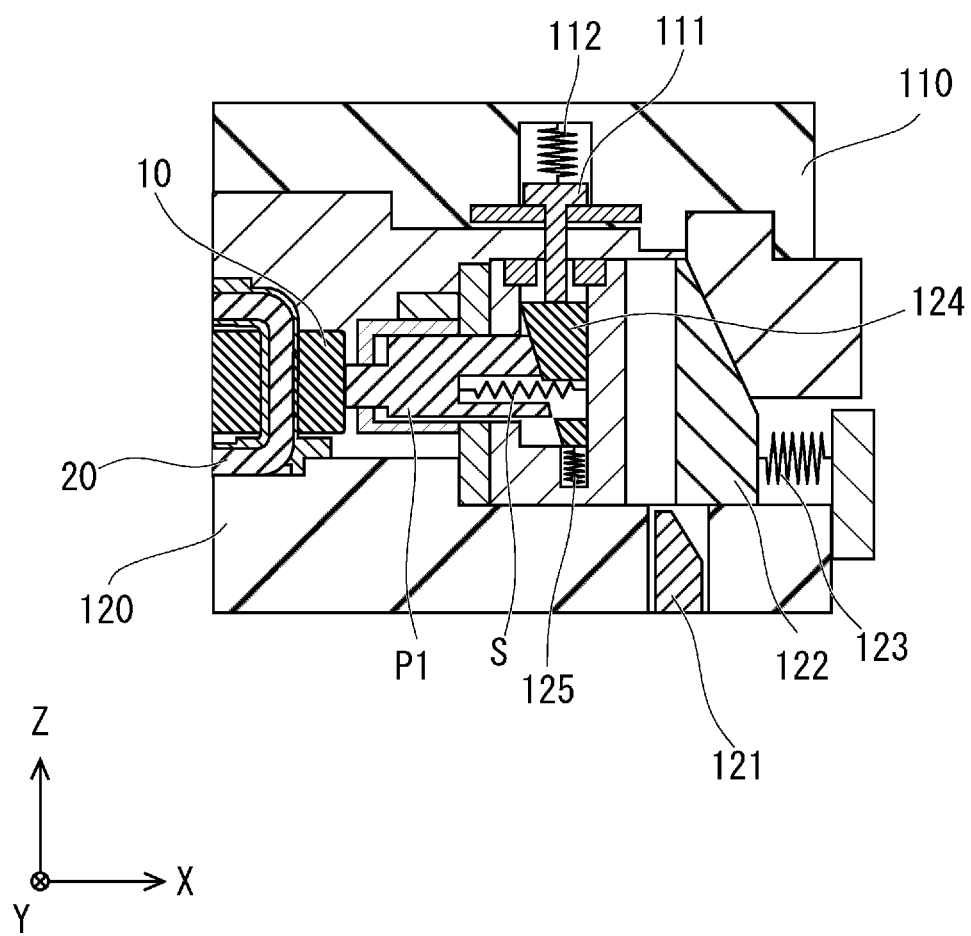
FIG. 3 is a schematic side view showing a configuration of the mold of the manufacturing apparatus according to the first embodiment.

FIG. 3 is a schematic side view of the mold 100 included in the manufacturing apparatus according to the first embodiment. Note that the manufacturing apparatus according to the first embodiment may include, in addition to the mold 100, an opening/closing apparatus (not shown) for controlling opening/closing of the mold 100, a resin injection apparatus (not shown), etc.

The mold 100 includes an upper mold 110 and a lower mold 120. When the upper mold 110 is lowered, the mold 100 is closed, and when the upper mold 110 is raised, the mold 100 is opened. The upper mold 110 includes a wedge pressing pin 111 and a spring 112 extended in the Z-axis direction.

The wedge pressing pin 111 is connected to the upper mold 110 with the spring 112 extended and contracted in the Z-axis direction interposed therebetween. When the mold 100 is closed, the wedge pressing pin 111 pushes down a wedge 124 described later, puts the wedge 124 between the pin P1 and a slide core block 122 described later to thereby fix the pin P1. The spring 112 imparts a force for pressing the wedge 124 to the wedge pressing pin 111. A load of the spring 112 is larger than a load of the spring 125 described later.

The lower mold 120 includes a projection 121, the slide core block 122, a spring 123, the wedge 124, the spring 125, the pin P1, and the spring S. The projection 121 has a projection in the Z-axis direction and is movable in the Z-axis direction.

The slide core block 122 is connected to the lower mold 120 with the spring 123 extended and contracted in the X-axis direction interposed therebetween, and is movable forward and backward in the X-axis direction. The slide core block 122 has a through hole into which the projection 121 can be inserted. When the projection 121 is inserted into the through hole, the slide core block 122 moves in the positive direction of the X-axis. When the projection 121 is retracted from the through hole, the slide core block 122 moves in the negative direction of the X-axis by an elastic force of the spring 123.

The wedge 124 is connected to the slide core block 122 with the spring 125 extended and contracted in the Z-axis direction interposed therebetween. The wedge 124 has a wedge shape whose width (e.g., the length thereof along the X-axis direction) becomes narrower toward the negative direction of the Z-axis. The wedge 124 is retracted to a position where the wedge 124 does not interfere with the pin P1 when the core 10 is disposed by an action of the spring 125 described later. During molding, the wedge 124 enters between the pin P1 and the slide core block 122 to fix the pin P1.

The spring 125 floats the wedge 124 by an elastic force after the mold 100 is opened and the wedge pressing pin 111 is retracted after the molding is completed. Then, the pin P1 returns to a state in which the pin P1 is not fixed, that is, a state in which the pin P1 can be displaced by a pressure.

The pin P1 functions as a positioning pin when the core 10 is disposed. The pin P1 functions as a core support pin for supporting the core 10 against the resin pressure during molding. A base end of the pin P1 is connected to the slide core block 122 with the spring S extended and contracted in the X-axis direction interposed therebetween (such a spring is also referred to as a lateral spring).

The pin P1 is extended from the base end thereof in the negative direction of the X-axis and in contact with an end surface of the core 10 on the positive direction of the X-axis. The pin P1 is extended from the base end thereof in the positive direction of the X-axis. The pin P1 has an inclined end surface that can be engaged with an end surface of the wedge 124 on the negative direction side of the X-axis. The length of the spring S may be set appropriately so that the pin P1 and the wedge 124 do not engage when the wedge 124 is not pressed.

Since the pin P1 is not fixed by the wedge 124 when the mold 100 is open, that is, when the upper mold 110 is raised, the spring S can absorb the dimensional variation of the core 10. On the other hand, when the mold is closed, that is, when the upper mold 110 is lowered, the wedge 124 is pressed by the wedge pressing pin 111, and thus the pin P1 is fixed by the wedge 124. Therefore, the manufacturing apparatus according to the first embodiment can both absorb the dimensional variation of the core 10 and prevent deformation of the core 10 due to the resin pressure during molding.

Figure 4:
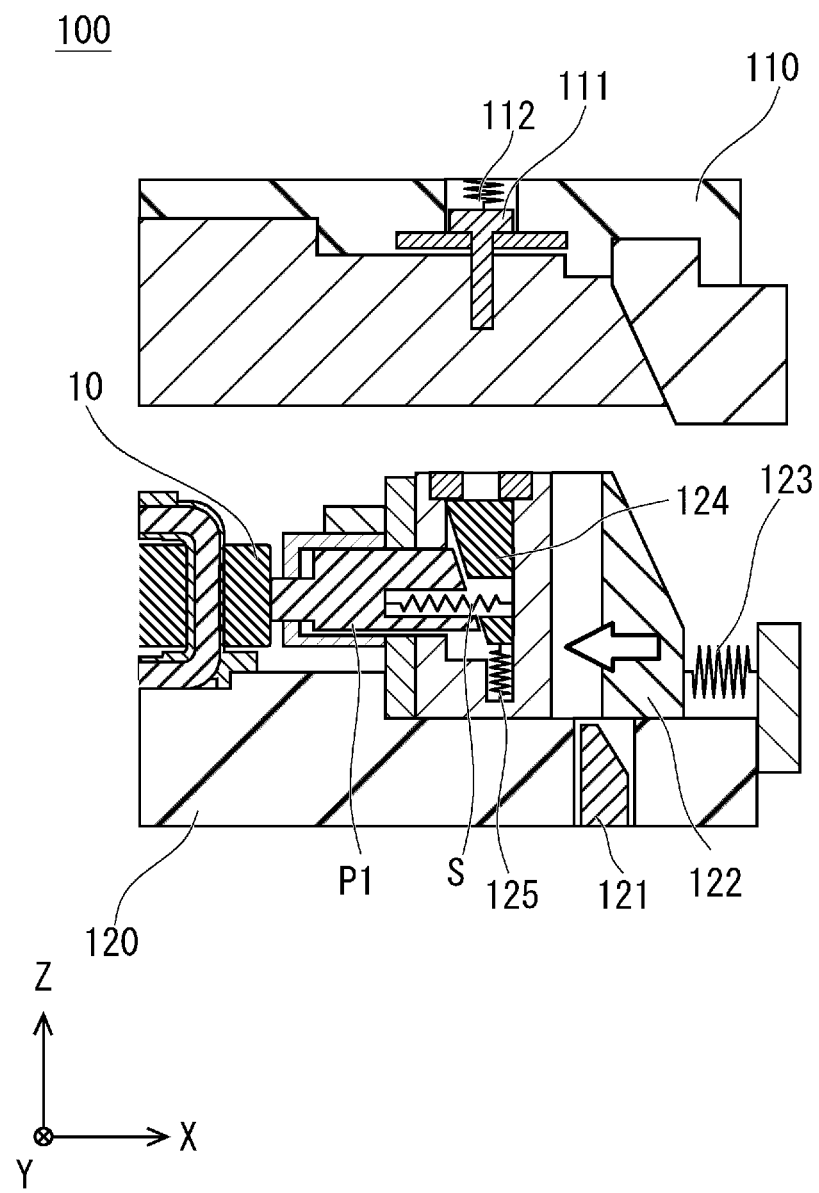
FIG. 4 is a schematic side view showing the mold of the manufacturing apparatus during positioning according to the first embodiment.

Next, a manufacturing method according to the first embodiment will be described in detail with reference to FIGS. 4 to 7. FIG. 4 is a schematic side view showing the mold 100 during positioning. The core 10 is disposed in the lower mold 120 in a state where the upper mold 110 is raised. When the projection 121 is moved in the negative direction of the Z-axis, the slide core block 122 moves in the negative direction of the X-axis as indicated by the arrow. The core 10 is positioned by the pin P1.

Figure 5:
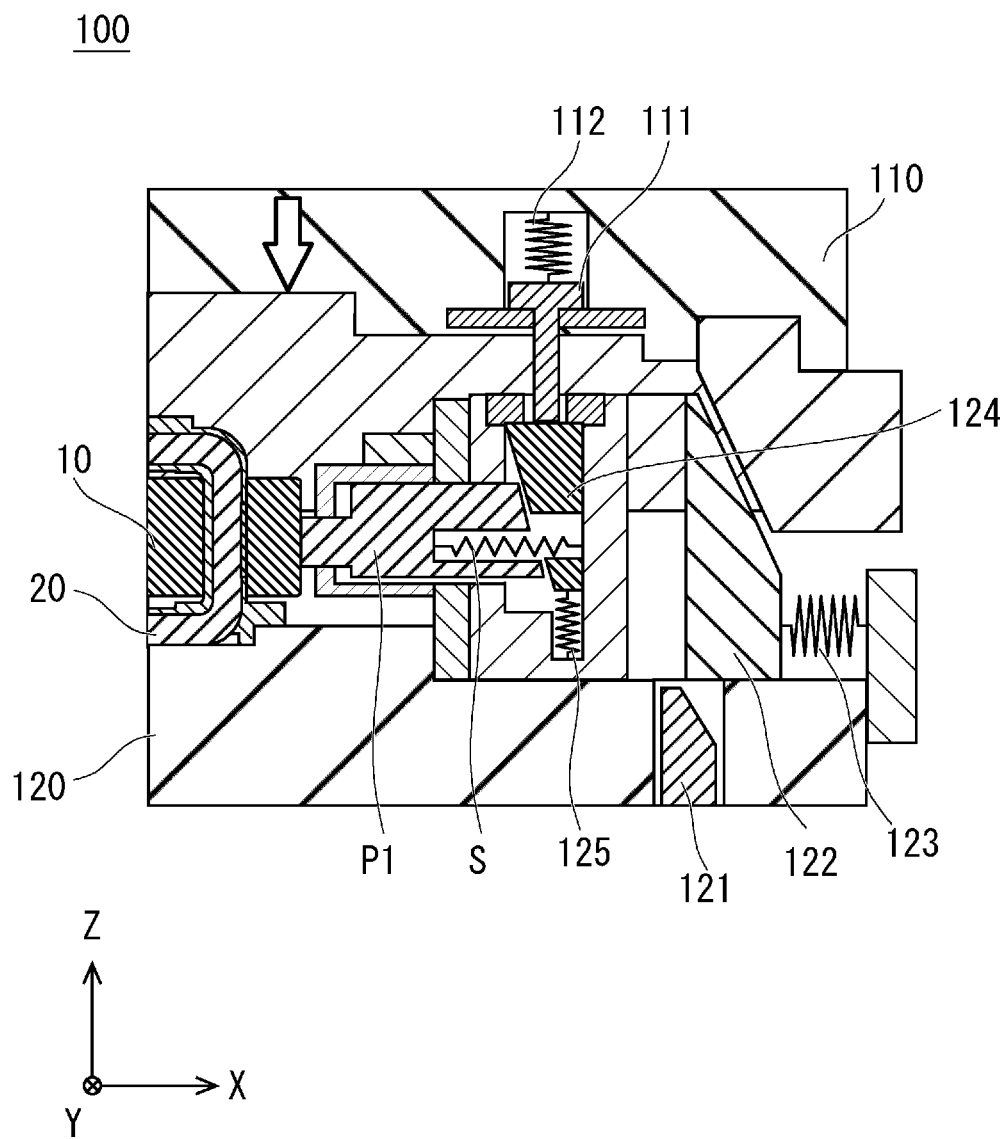
FIG. 5 is a schematic side view showing the mold of the manufacturing apparatus when an upper mold is lowered according to the first embodiment.

FIG. 5 is a schematic side view showing the mold 100 when the upper mold 110 is lowered. The upper mold 110 is lowered as indicated by the arrow. The wedge pressing pin 111 starts pressing the wedge 124 in response to the lowering of the upper mold 110. The force of the wedge pressing pin 111 pressing the wedge 124 may be appropriately configured so that the core 10 will not be broken. For example, the wedge pressing pin 111 may press the wedge 124 with a predetermined force.

Figure 6:
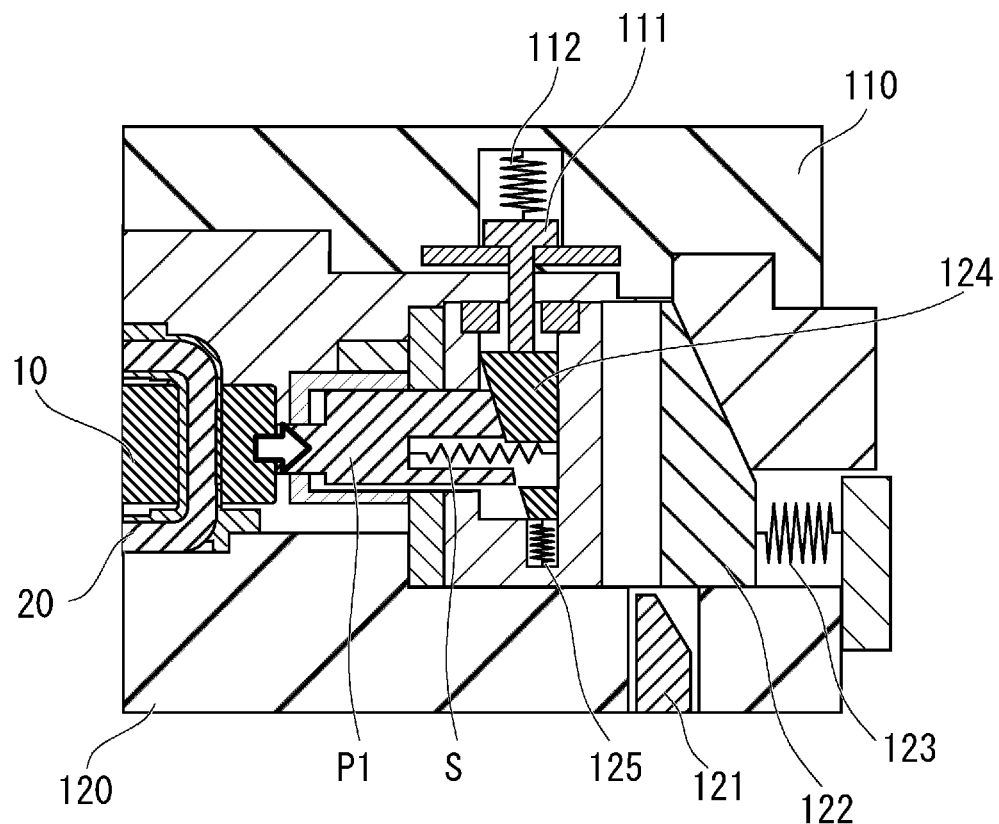
FIG. 6 is a schematic side view showing the mold of the manufacturing apparatus during molding according to the first embodiment.

FIG. 6 is a schematic side view showing the mold 100 during molding. When the lowering of the upper mold 110 is completed, a mold clamping force is applied to the mold 100, and the pin P1 is fixed by the wedge 124 and the wedge pressing pin 111. Then, the wedge 124 is inserted between the pin P1 and the slide core block 122. When the resin is injected into the mold 100, the core support pin P1 is pressurized in the positive direction of the X-axis as indicated by the arrow. The wedge 124 converts the resin pressure into a force in the vertical direction, and the wedge pressing pin 111 presses the wedge 124 in the vertical direction. For example, the pin P1 can be fixed by setting the spring coefficient of the spring 112 sufficiently high.

Figure 7:
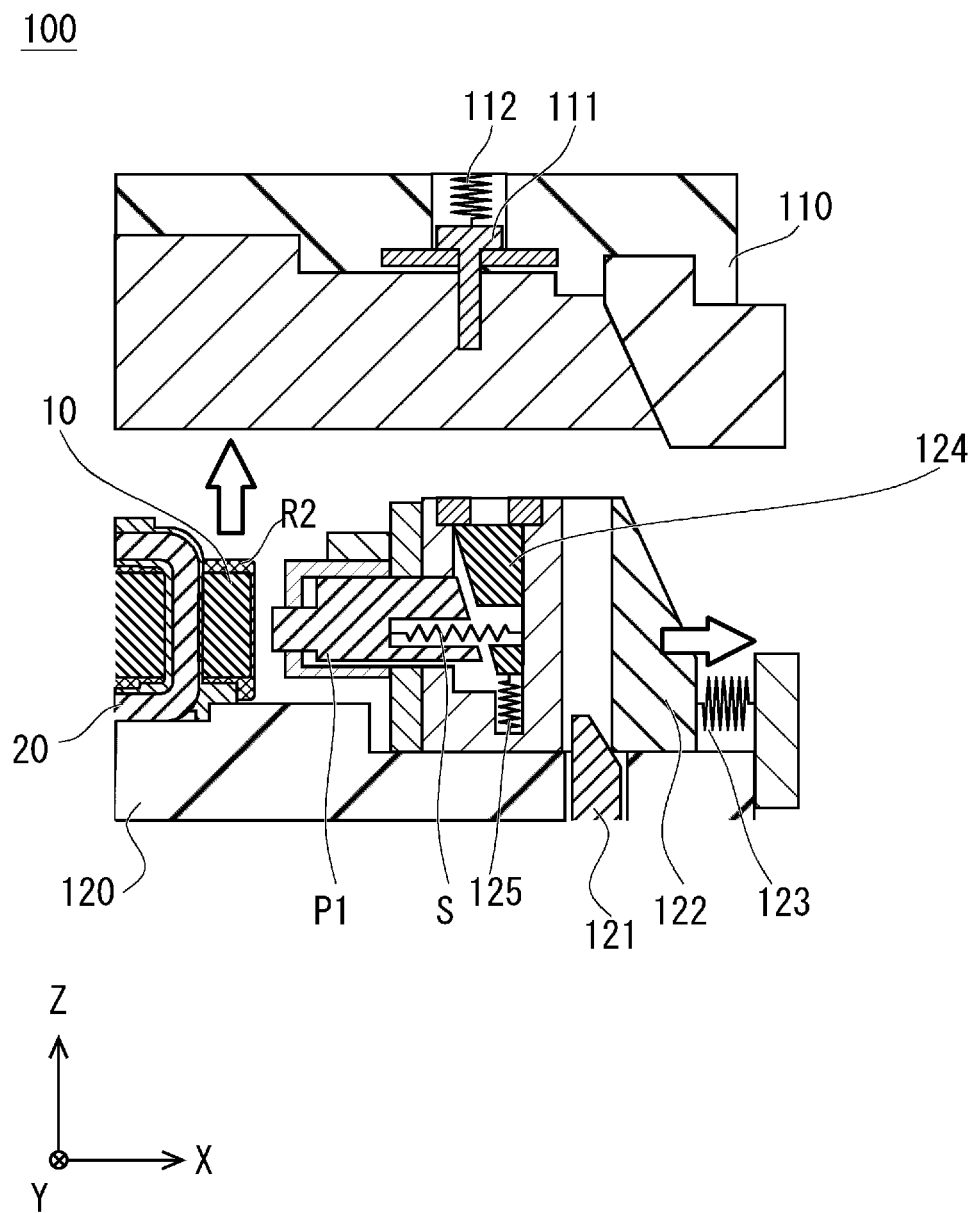
FIG. 7 is a schematic side view showing the mold of the manufacturing apparatus when a molded article is taken out according to the first embodiment.

FIG. 7 is a schematic side view showing the mold 100 when the molded article is taken out. After the resin molding is completed, the upper mold 110 is raised as indicated by the upward arrow. By doing so, the wedge pressing pin 111 is retracted, and the wedge 124 floats by the spring 125. Next, the slide core block 122 is moved in the positive direction of the X-axis by moving the projection 121 in the positive direction of the Z-axis, and the molded article is taken out. Note that a reference sign R2 indicates a resin molded into a molded article.

The manufacturing apparatus according to the first embodiment performs positioning while absorbing the dimensional variation of the core. At this time, the pins P1 can be displaced by the springs S. In the manufacturing apparatus according to the first embodiment, the pins P1 are fixed by a wedge mechanism when a molded article is molded. Therefore, deformation of the core is reduced without moving the pins P1 subjected to the resin pressure, and cracking of the core can be prevented.

Second Embodiment

Next, a manufacturing apparatus according to a second embodiment will be described with reference to FIGS. 8 to 11. Hereinafter, differences of the second embodiment from the first embodiment will be mainly described. A mold 100a of the manufacturing apparatus according to the second embodiment includes, in place of the spring 112, an air cylinder 113 for vertically driving the wedge pressing pin 111. A load applied by the air cylinder 113 is larger than a load applied by the spring 125.

Figure 8:
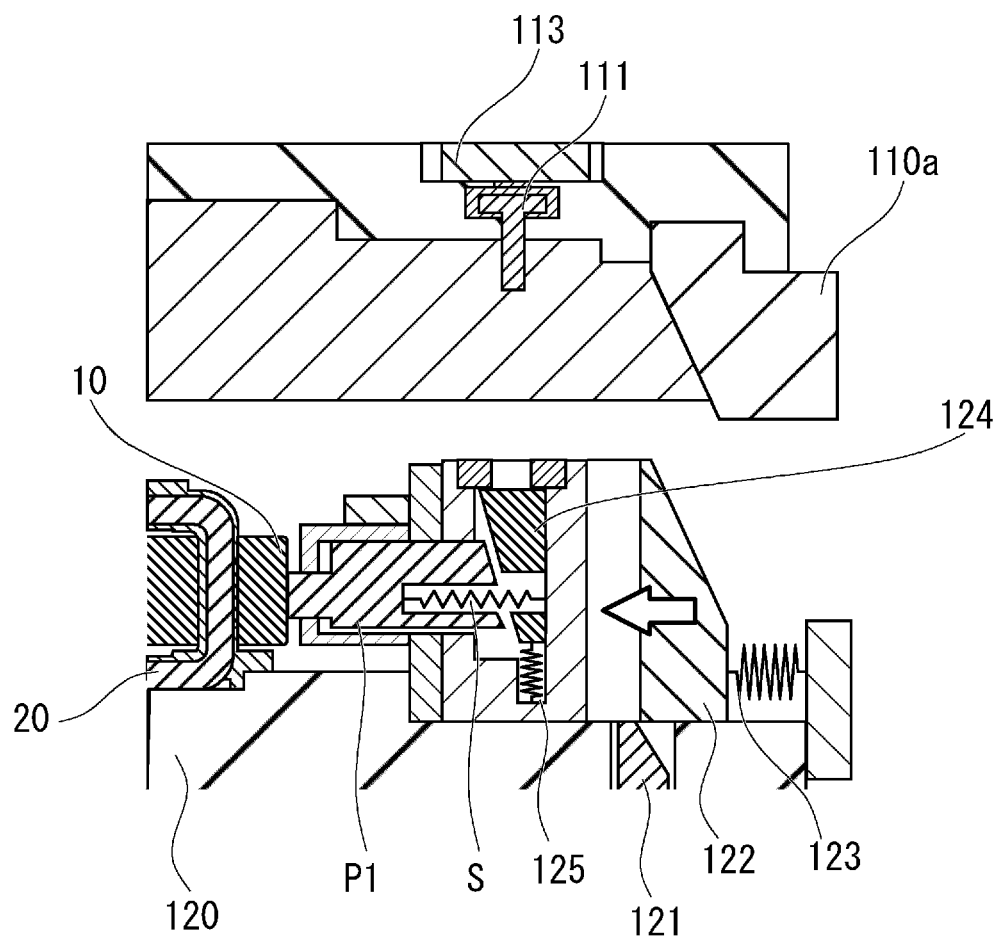
FIG. 8 is a schematic side view showing a mold of a manufacturing apparatus during positioning according to the second embodiment.

FIG. 8 is a schematic side view showing the mold 100a during positioning. First, the core 10 is disposed in the lower mold 120. Then, the slide core block 122 is moved in the negative direction of the X-axis as indicated by the arrow, and the core 10 is positioned by the pin P1.

Figure 9:
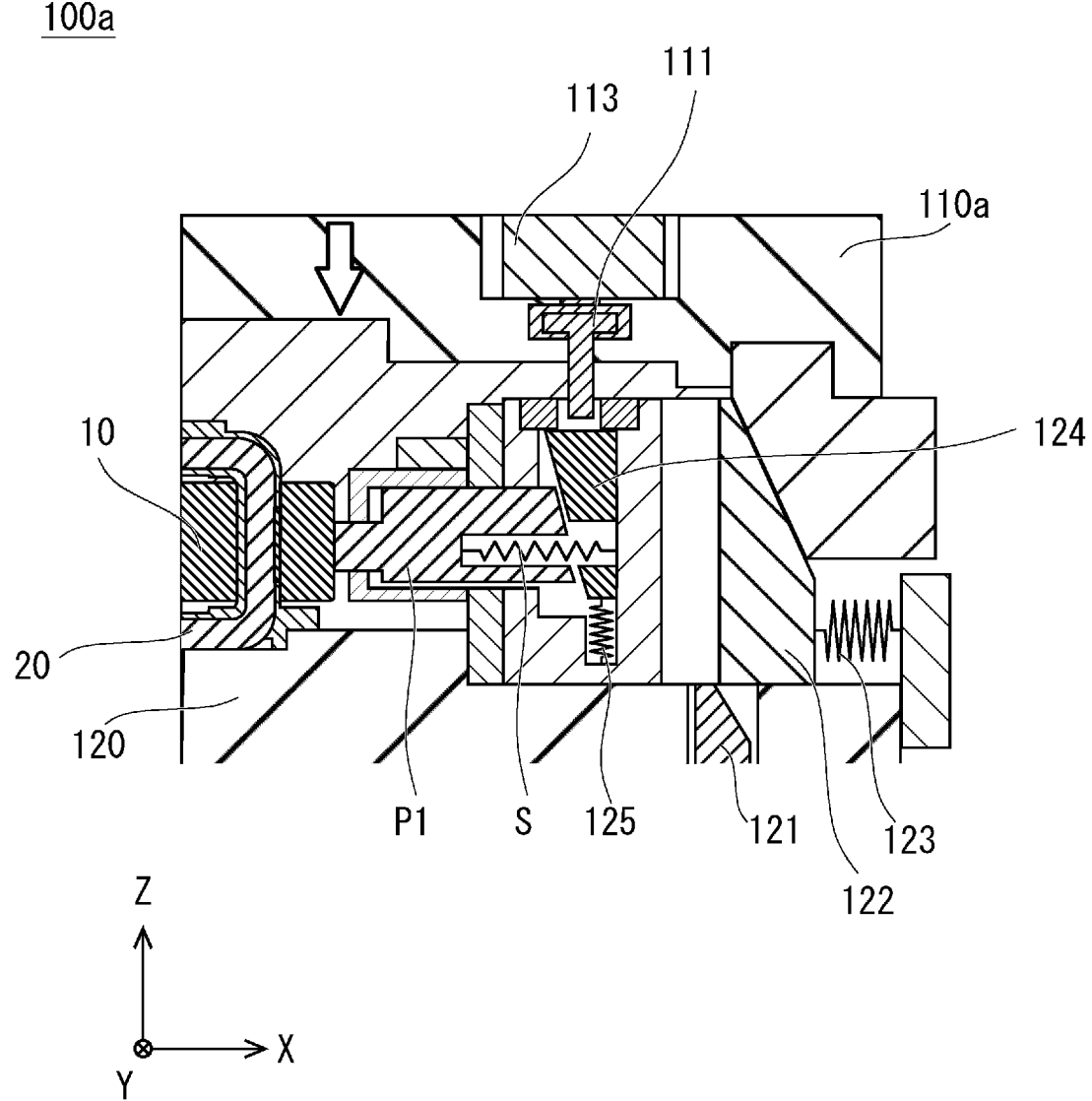
FIG. 9 is a schematic side view showing a mold of the manufacturing apparatus when an upper mold is lowered according to the second embodiment.

FIG. 9 is a schematic side view showing the mold 100a when the upper mold 110b is lowered. As indicated by the arrow, the upper mold 110b is lowered. When the lowering of the upper mold 110b is completed, a mold clamping force is applied to the mold 100a. At this point, the wedge 124 is not yet pressed by the wedge pressing pin 111.

It is known that each part of the mold 100a is slightly deformed on the order of microns by clamping the mold 100a. Therefore, if the wedge pressing pin 111 presses the wedge 124 when the lowering of the upper mold 110b is completed, there is a possibility that the pin P1 may push the core 10 and breaks it due to the deformation of each part. Therefore, the timing at which the lowering of the mold 100a is completed is shifted from the timing at which the wedge 124 is pressed.

Figure 10:
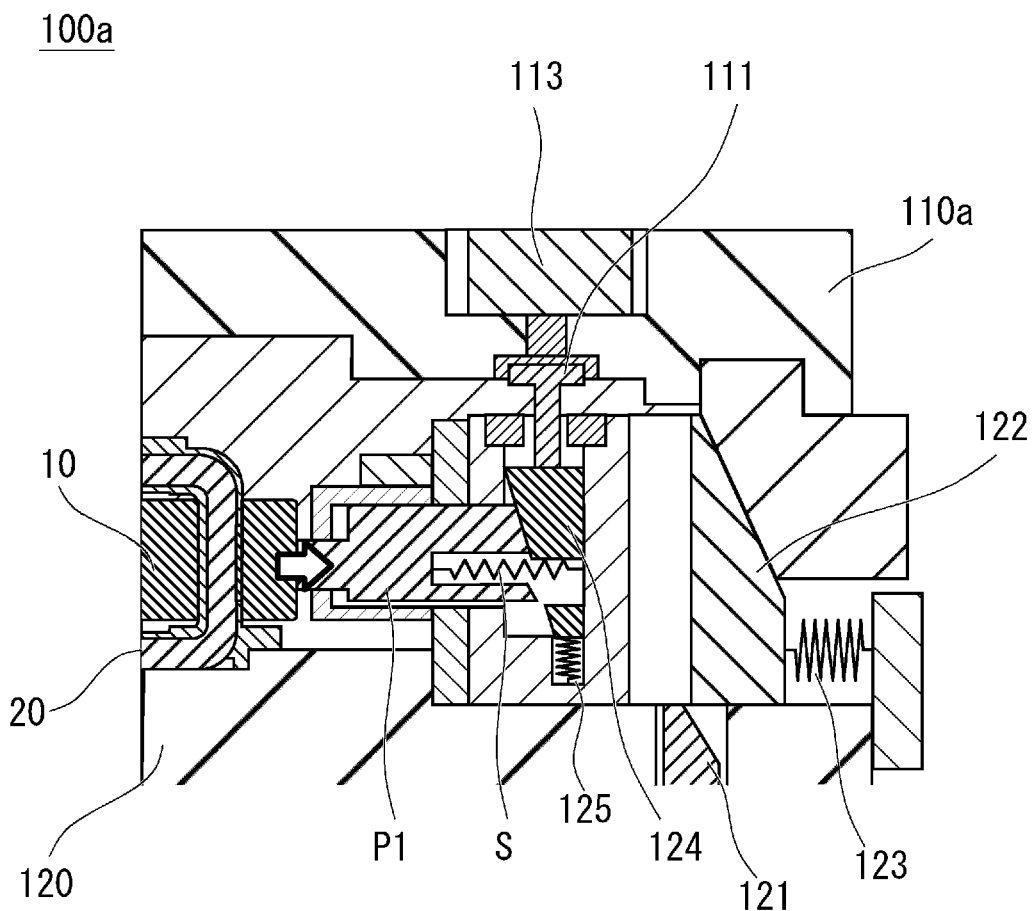
FIG. 10 is a schematic side view showing the mold of the manufacturing apparatus during molding according to the second embodiment.

FIG. 10 is a schematic side view showing the mold 100a during molding. After the lowering of the upper mold 110b is completed, the air cylinder 113 is operated to move the wedge pressing pin 111 in the negative direction of the Z-axis. When the mold 100a is closed and the wedge pressing pin 111 is lowered by the air cylinder 113, the wedge 124 is pressed by the wedge pressing pin 111. Thus, the wedge 124 is inserted between the pin P1 and the wedge pressing pin 111, and thus the positions of the pins P1 are fixed. The air cylinder 113 may, for example, pressurize the wedge pressing pin 111 with a predetermined load. After that, the resin is injected into the mold 100a, and the wedge 124 converts the resin pressure into a force in the vertical direction. The core 10 is pressed by the wedge pressing pin 111 through the pins P1 and the wedge 124.

Figure 11:
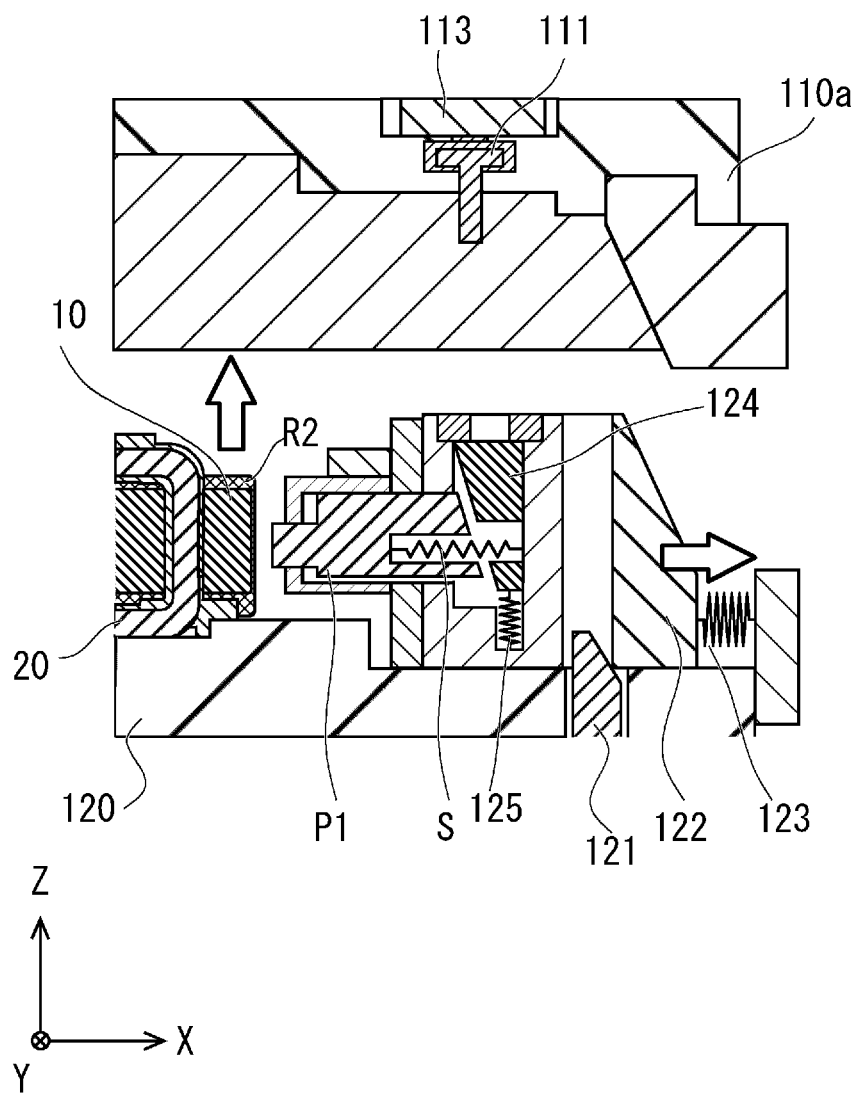
FIG. 11 is a schematic side view showing the mold of the manufacturing apparatus when a molded article is taken out according to the second embodiment.

FIG. 11 is a schematic side view showing the mold 100a when the molded article is taken out. When the upper mold 110a is raised as shown by the arrow, the wedge pressing pin 111 is retracted, and the wedge 124 floats by the spring 125. The upper mold 110a may be raised after the wedge pressing pin 111 is raised by using the air cylinder 113. After the slide core block 122 is moved in the positive direction of the X-axis, a molded article is taken out.

The manufacturing apparatus according to the second embodiment uses the air cylinder to shift the timing at which the lowering of the mold is completed from the timing at which the pins P1 are fixed by the wedge. This prevents the core from being cracked due to the deformation of the parts caused by the mold clamping force of the mold.

Note that an electric drive mechanism or a hydraulic drive mechanism may be provided in place of the air cylinder 113. However, the drive mechanism shall be capable of withstanding the temperature of the mold 100a. Further note that, instead of driving the wedge pressing pin 111 in the vertical direction, a pin pressing member described later may be driven in the vertical direction.

Third Embodiment

Figure 12:
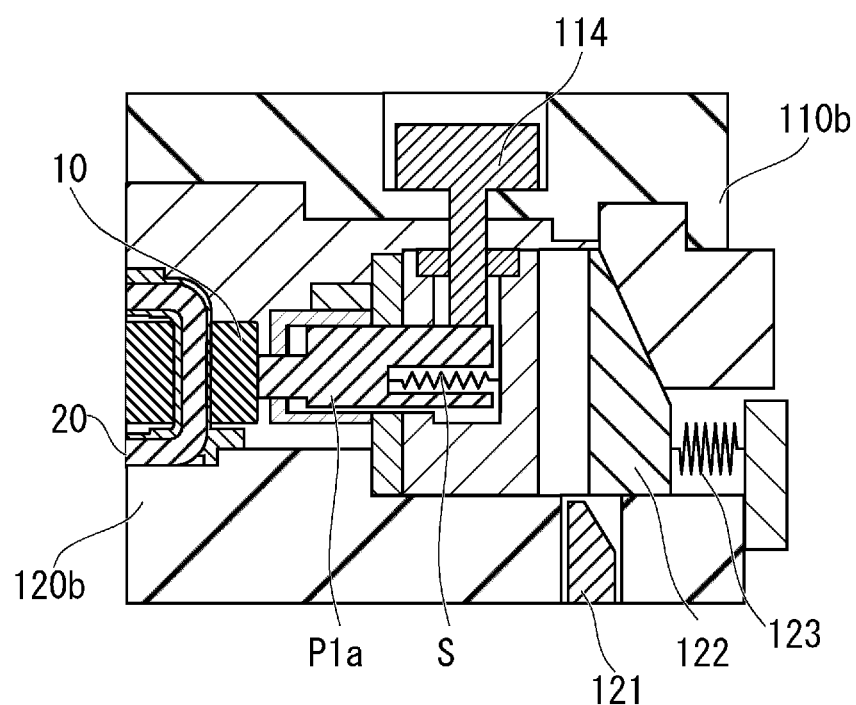
FIG. 12 is a schematic side view showing a configuration of a mold of a manufacturing apparatus according to a third embodiment.

Next, a manufacturing apparatus according to a third embodiment will be described with reference to FIG. 12. A mold 100b of the manufacturing apparatus according to the third embodiment includes an upper mold 110b and a lower mold 120b. Comparing FIG. 3 with FIG. 12, the upper mold 110b does not include the wedge pressing pin 111, and instead includes a pin pressing member 114. The pin pressing member 114 presses a pin P1a described later by closing the mold 100b. The pin pressing member 114 may be fixed to the upper mold 110b.

Furthermore, the lower mold 120b does not include the wedge 124, and the pin P1 is replaced by the pin P1a. The pin P1a includes a contact surface that is in contact with a lower surface of the pin pressing member 114. The pin P1a is fixed to the mold 100b by a frictional force between the pin pressing member 114 and the pin P1a. An upper surface of the pin P1a may include, for example, a friction member.

In such a case, in a manner similar to the first embodiment, the dimensional variation of the core 10 can be absorbed by the springs S, and the deformation of the core 10 can be prevented by fixing the pin P1a subjected to the resin pressure by the frictional force.

Figure 13:
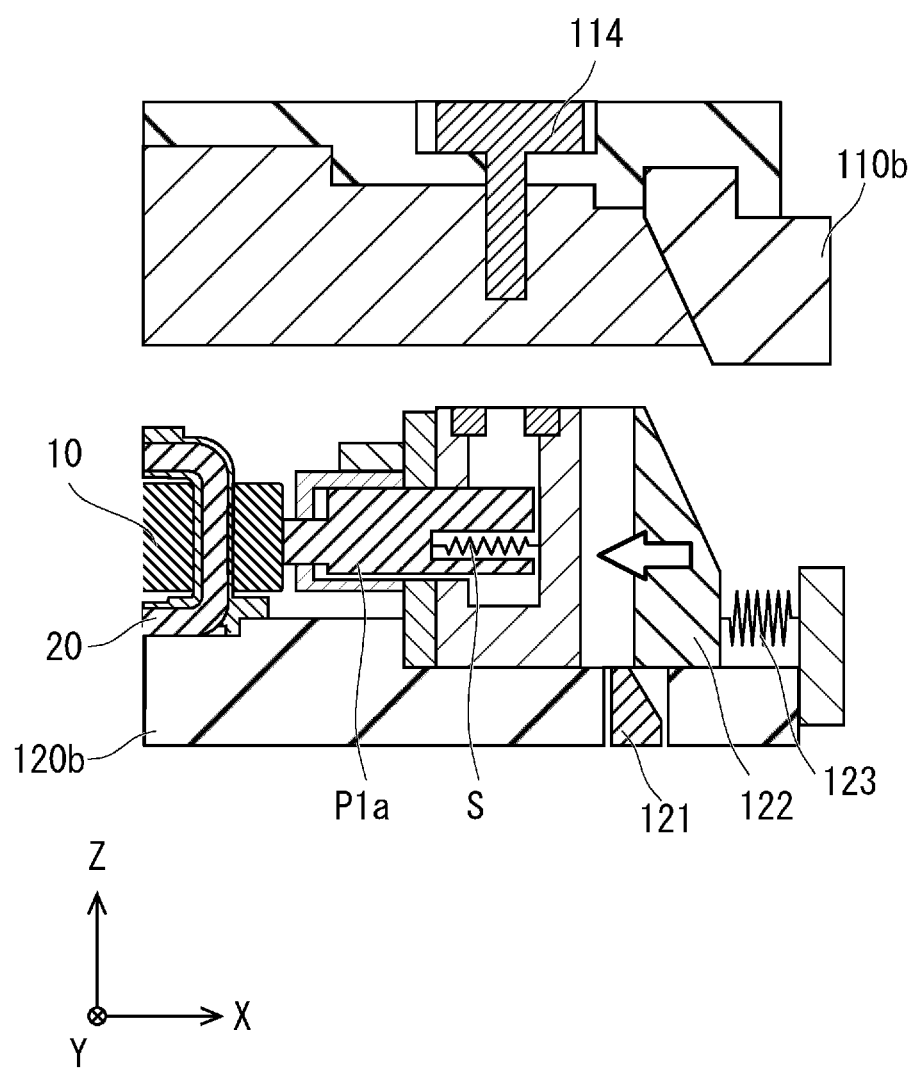
FIG. 13 is a schematic side view showing the mold of the manufacturing apparatus during positioning according to the third embodiment.

Next, a manufacturing method according to the third embodiment will be described with reference to FIGS. 13 to 16. FIG. 13 is a schematic side view showing the mold 100b during positioning. The core 10 is disposed in a lower mold 120b in a state where the upper mold 110b is raised. When the slide core block 122 moves in the X-axis negative direction, the core 10 is positioned by the pin P1a.

Figure 14:
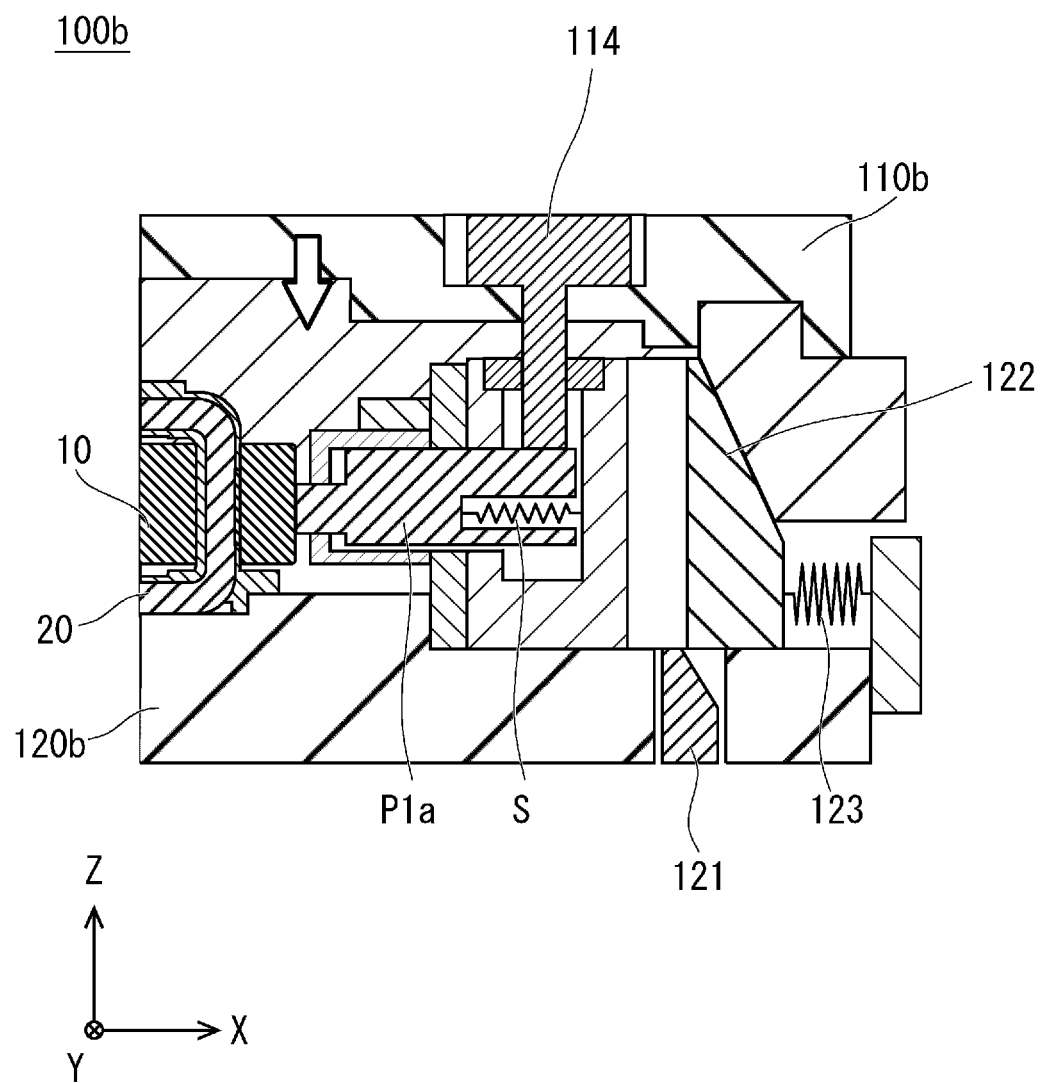
FIG. 14 is a schematic side view showing a mold of the manufacturing apparatus when an upper mold is lowered according to the third embodiment.

FIG. 14 is a schematic side view showing the mold 100b when the upper mold 110b is lowered. As indicated by the arrow, the upper mold 110b is lowered. When the lowering of the upper mold 110b is completed, a mold clamping force is applied to the mold 100b. At this time, the pin pressing member 114 presses the upper surface of the pin P1a in the negative direction of the Z-axis, and thus the position of the pin P1a in the X-axis direction is fixed by friction.

Figure 15:
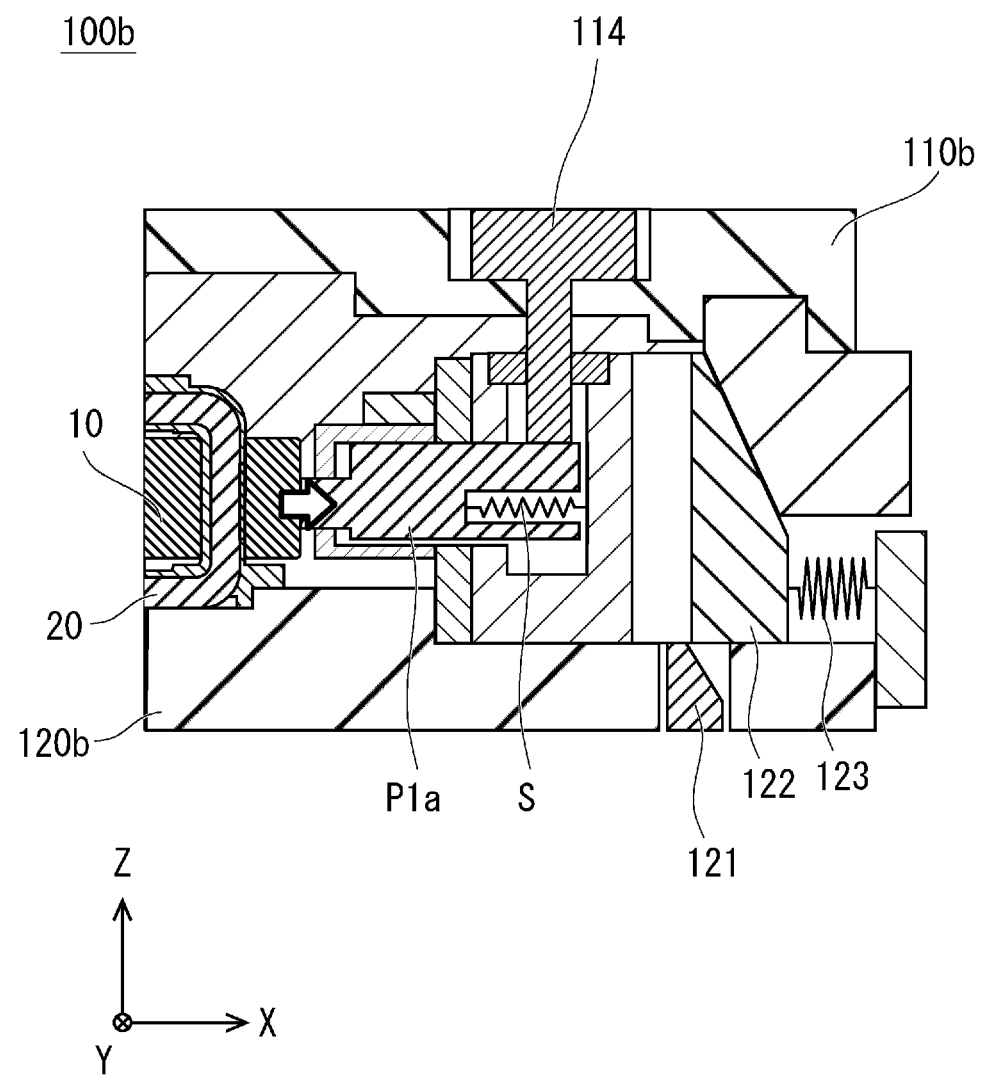
FIG. 15 is a schematic side view showing the mold of the manufacturing apparatus during molding according to the third embodiment.

FIG. 15 is a schematic side view showing the mold 100b during molding. A resin is injected into the mold 100b, and thus the pin P1a receives the resin pressure in the direction indicated by the arrow. The pin P1a receives a frictional force in the negative direction of the X-axis from the pin pressing member 114 and then fixed.

Figure 16:
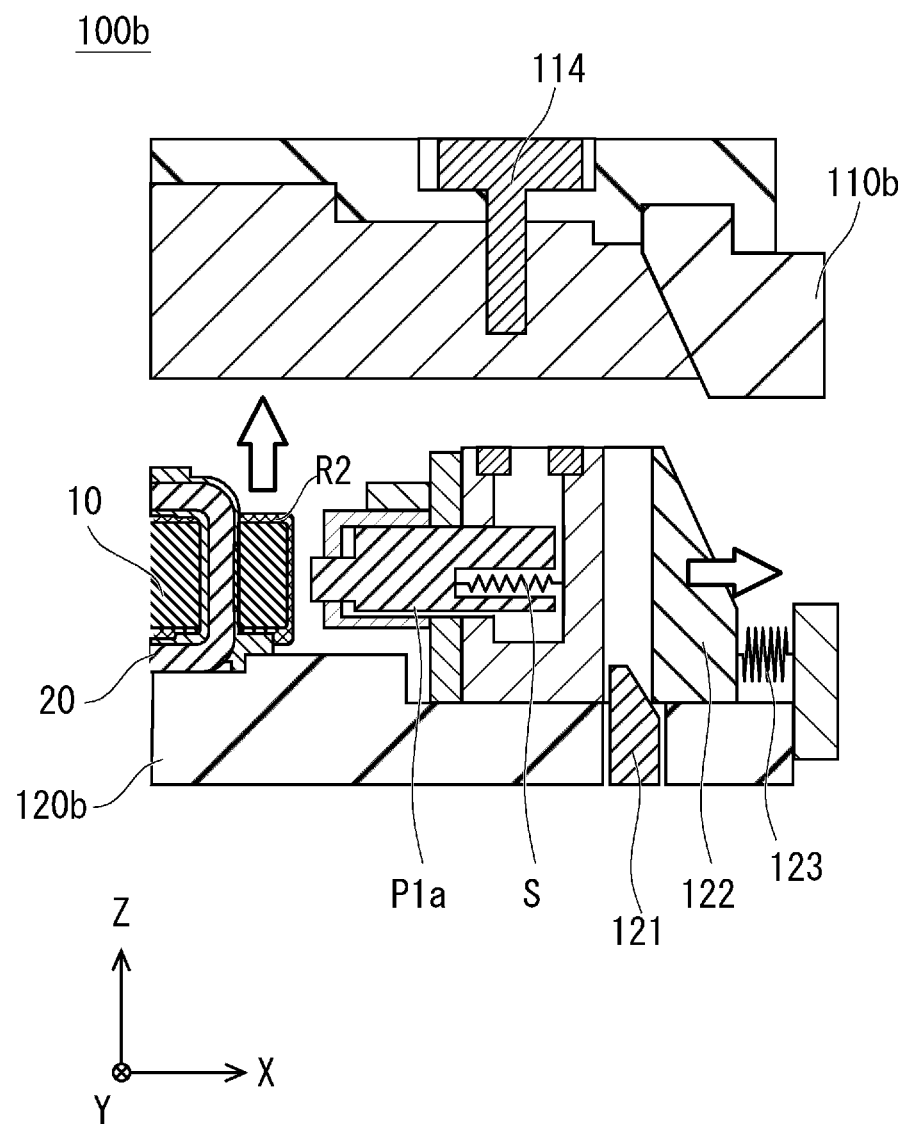
FIG. 16 is a schematic side view showing the mold of the manufacturing apparatus when a molded article is taken out according to the third embodiment.

FIG. 16 is a schematic side view showing the mold 100b when the molded article is taken out. When the resin molding is completed, the upper mold 110b is raised as indicated by the upward arrow, and the pin pressing member 114 is retracted. Simultaneously with the retraction of the pin pressing member 114, the pin P1a returns to a state where it is supported displacably by the spring S. After the slide core block 122 is moved in the direction indicated by the rightward arrow, the molded article is taken out.

The manufacturing apparatus according to the third embodiment performs positioning by absorbing the dimensional variation of the core. At this time, the pin P1a is supported displacably by the spring S. On the other hand, during molding, the pin P1a is fixed by the frictional force, and the core can be prevented from being deformed and broken.

The first to third embodiments may be combined as appropriate. For example, in the third embodiment, the pin pressing member 114 may be driven by the air cylinder 113.

Note that the present disclosure is not limited to the above-described embodiments, and may be suitably modified without departing from the spirit.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An apparatus for manufacturing a reactor including a core, the apparatus comprising:
   a mold including an upper mold, a lower mold, and a cavity for housing the core, wherein
   the lower mold includes a plurality of pins protruding into the cavity,
   when the core is disposed in the cavity, at least one of the plurality of pins is not fixed, and each of the pins functions as a positioning pin,
   when a molded article is molded, the at least one pin is fixed, and each pin functions as a core support pin for supporting the core against a resin pressure during molding, and
   the lower mold includes a wedge, the upper mold includes a wedge pressing pin, the wedge pressing pin starts pressing the wedge in response to a lowering of the upper mold, and the at least one pin is fixed by the wedge when the lowering of the upper mold is completed.

2. The apparatus according to claim 1, wherein
   when the core is disposed in the cavity, the at least one pin is displaced in response to a pressure received from the core.

3. The apparatus according to claim 1, wherein
   the apparatus is an apparatus for manufacturing a reactor including a pair of E-shaped cores, and
   a width of an outer leg core of each E-shaped core is shorter than a width of a middle leg core of each E-shaped core.

4. The apparatus according to claim 1, wherein
   when the wedge pressing pin is connected to the upper mold with a spring extending in a vertical direction.

5. The apparatus according to claim 1, wherein
   the lower mold includes a slide core block including a through hole, a projection which is insertable into the through hole, and a first spring connecting the slide core block to the lower mold extending in a horizontal direction, the slide core block being movable forward and backward in the horizontal direction, and
   the wedge is connected to the slide core block with a second spring extending in a vertical direction.

6. A method for manufacturing a reactor including a core, the method comprising:
   disposing the core in a mold including an upper mold, a lower mold, and a cavity for housing the core; and
   molding a molded article by using the mold, wherein
   the lower mold includes a plurality of pins protruding into the cavity,
   in the disposing of the core, at least one of the plurality of pins is not fixed, and each of the pins functions as a positioning pin,
   in the molding of the molded article, the at least one pin is fixed, and each pin functions as a core support pin for supporting the core against a resin pressure during molding, and
   the lower mold includes a wedge, the upper mold includes a wedge pressing pin, the wedge pressing pin starts pressing the wedge in response to a lowering of the upper mold, and the at least one pin is fixed by the wedge when the lowering of the upper mold is completed.

* * * * *